(12) United States Patent
Gadwale

(10) Patent No.: US 9,519,888 B2
(45) Date of Patent: Dec. 13, 2016

(54) END USE TRANSPARENT EMAIL ATTACHMENT HANDLING TO OVERCOME SIZE AND ATTACHMENT POLICY BARRIERS

(75) Inventor: Adithya Gadwale, Severna Park, MD (US)

(73) Assignee: Telecommunication Systems, Inc., Annapolis, MD (US)

( * ) Notice: Subject to any disclaimer, the term of this patent is extended or adjusted under 35 U.S.C. 154(b) by 721 days.

(21) Appl. No.: 11/797,818

(22) Filed: May 8, 2007

(65) Prior Publication Data

US 2008/0281924 A1 Nov. 13, 2008

Related U.S. Application Data

(60) Provisional application No. 60/798,332, filed on May 8, 2006.

(51) Int. Cl.
*G06F 15/16* (2006.01)
*G06Q 10/10* (2012.01)
*H04L 12/58* (2006.01)

(52) U.S. Cl.
CPC ............ *G06Q 10/107* (2013.01); *H04L 12/58* (2013.01)

(58) Field of Classification Search
USPC ................................................ 709/206, 230
See application file for complete search history.

(56) References Cited

U.S. PATENT DOCUMENTS

| | | |
|---|---|---|
| 1,103,073 A | 7/1914 | O'Connel |
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Droro et al. |
| 5,119,104 A | 6/1992 | Heller |
| 5,144,283 A | 9/1992 | Arens et al. |

(Continued)

OTHER PUBLICATIONS

International Search Report in PCT/Us07/11029 dated Jul. 31, 2008.

(Continued)

*Primary Examiner* — Liangche A Wang

(74) *Attorney, Agent, or Firm* — Tarolli, Sundheim, Covell & Tummino LLP

(57) ABSTRACT

Email server side or client side components either remove email attachments from the relevant email, or identify the attachment while the email is being composed and makes the attachment available from a secure website or file hosting site. The recipient then receives instructions in the email and links to access the attachments rather than the attachments themselves. Email attachment size limitations are overcome for sender/recipient mail systems. Also, file type limitations related to email attachments are overcome, provides improved attachment security, and reduces email bandwidth costs.

8 Claims, 4 Drawing Sheets

END USER TRANSPARENT EMAIL ATTACHMENT HANDLING TO OVERCOME SIZE AND ATTACHMENT POLICY BARRIERS

(56) References Cited

U.S. PATENT DOCUMENTS

| | | | |
|---|---|---|---|
| 5,177,478 | A | 1/1993 | Wagai et al. |
| 5,193,215 | A | 3/1993 | Olmer |
| 5,208,756 | A | 5/1993 | Song |
| 5,214,789 | A | 5/1993 | George |
| 5,218,367 | A | 6/1993 | Sheffer et al. |
| 5,223,844 | A | 6/1993 | Mansell et al. |
| 5,235,630 | A | 8/1993 | Moodey et al. |
| 5,266,944 | A | 11/1993 | Carroll et al. |
| 5,289,527 | A | 2/1994 | Tiedemann, Jr. |
| 5,293,642 | A | 3/1994 | Lo |
| 5,299,132 | A | 3/1994 | Wortham |
| 5,325,302 | A | 6/1994 | Izidon et al. |
| 5,334,974 | A | 8/1994 | Simms et al. |
| 5,343,493 | A | 8/1994 | Karimullah |
| 5,347,568 | A | 9/1994 | Moody et al. |
| 5,351,235 | A | 9/1994 | Lahtinen |
| 5,361,212 | A | 11/1994 | Class et al. |
| 5,363,425 | A | 11/1994 | Mufti et al. |
| 5,374,936 | A | 12/1994 | Feng |
| 5,379,451 | A | 1/1995 | Nakagoshi et al. |
| 5,381,338 | A | 1/1995 | Wysocki et al. |
| 5,387,993 | A | 2/1995 | Heller et al. |
| 5,388,147 | A | 2/1995 | Grimes |
| 5,390,339 | A | 2/1995 | Bruckert et al. |
| 5,394,158 | A | 2/1995 | Chia |
| 5,396,227 | A | 3/1995 | Carroll et al. |
| 5,398,190 | A | 3/1995 | Wortham |
| 5,406,614 | A | 4/1995 | Hara |
| 5,418,537 | A | 5/1995 | Bird |
| 5,423,076 | A | 6/1995 | Westergreen et al. |
| 5,432,841 | A | 7/1995 | Rimer |
| 5,434,789 | A | 7/1995 | Fraker et al. |
| 5,454,024 | A | 9/1995 | Lebowitz |
| 5,461,390 | A | 10/1995 | Hoshen |
| 5,470,233 | A | 11/1995 | Fruchterman et al. |
| 5,479,408 | A | 12/1995 | Will |
| 5,479,482 | A | 12/1995 | Grimes |
| 5,485,161 | A | 1/1996 | Vaughn |
| 5,485,163 | A | 1/1996 | Singer et al. |
| 5,488,563 | A | 1/1996 | Chazelle et al. |
| 5,497,149 | A | 3/1996 | Fast |
| 5,508,931 | A | 4/1996 | Snider |
| 5,513,243 | A | 4/1996 | Kage |
| 5,515,287 | A | 5/1996 | Hakoyama et al. |
| 5,519,403 | A | 5/1996 | Bickley et al. |
| 5,532,690 | A | 7/1996 | Hertel |
| 5,535,434 | A | 7/1996 | Siddoway et al. |
| 5,539,398 | A | 7/1996 | Hall et al. |
| 5,543,776 | A | 8/1996 | L'Esperance et al. |
| 5,552,772 | A | 9/1996 | Janky et al. |
| 5,555,286 | A | 9/1996 | Tendler |
| 5,568,119 | A | 10/1996 | Schipper et al. |
| 5,574,648 | A | 11/1996 | Pilley |
| 5,579,372 | A | 11/1996 | Astrom |
| 5,588,009 | A | 12/1996 | Will |
| 5,592,535 | A | 1/1997 | Klotz |
| 5,604,486 | A | 2/1997 | Lauro |
| 5,606,313 | A | 2/1997 | Allen et al. |
| 5,606,850 | A | 3/1997 | Nakamura |
| 5,610,815 | A | 3/1997 | Gudat et al. |
| 5,614,890 | A | 3/1997 | Fox |
| 5,615,116 | A | 3/1997 | Gudat et al. |
| 5,621,793 | A | 4/1997 | Bednarek et al. |
| 5,628,051 | A | 5/1997 | Salin |
| 5,633,912 | A | 5/1997 | Tsoi |
| 5,673,306 | A | 9/1997 | Amadon et al. |
| 5,682,600 | A | 10/1997 | Salin |
| 5,692,037 | A | 11/1997 | Friend |
| 5,694,546 | A | 12/1997 | Reisman |
| 5,740,534 | A | 4/1998 | Ayerst et al. |
| 5,761,618 | A | 6/1998 | Lynch et al. |
| 5,767,795 | A | 6/1998 | Schaphorst |
| 5,768,509 | A | 6/1998 | Gunluk |
| 5,771,355 | A * | 6/1998 | Kuzma ........................ 709/232 |
| 5,774,533 | A | 6/1998 | Patel |
| 5,781,901 | A * | 7/1998 | Kuzma ................ G06Q 10/107 |
| 5,787,357 | A | 7/1998 | Salin |
| 5,794,142 | A | 8/1998 | Vantilla et al. |
| 5,797,091 | A | 8/1998 | Clise et al. |
| 5,797,094 | A | 8/1998 | Houde et al. |
| 5,797,096 | A | 8/1998 | Lupien et al. |
| 5,802,492 | A | 9/1998 | DeLorme et al. |
| 5,806,000 | A | 9/1998 | Vo et al. |
| 5,822,700 | A | 10/1998 | Hult et al. |
| 5,828,740 | A | 10/1998 | Khuc et al. |
| 5,867,495 | A | 2/1999 | Elliott et al. |
| 5,903,723 | A | 5/1999 | Beck et al. |
| 5,905,736 | A | 5/1999 | Ronen et al. |
| 5,920,821 | A | 7/1999 | Seaholtz et al. |
| 5,930,701 | A | 7/1999 | Skog |
| 5,943,399 | A | 8/1999 | Bannister et al. |
| 5,946,629 | A | 8/1999 | Sawyer et al. |
| 5,946,630 | A | 8/1999 | Willars et al. |
| 5,949,326 | A | 9/1999 | Wicks et al. |
| 5,950,130 | A | 9/1999 | Coursey |
| 5,953,398 | A | 9/1999 | Hill |
| 5,960,074 | A | 9/1999 | Clarke |
| 5,966,663 | A | 10/1999 | Gleason |
| 5,974,054 | A | 10/1999 | Couts et al. |
| 5,978,685 | A | 11/1999 | Laiho |
| 5,987,323 | A | 11/1999 | Huotari |
| 5,999,811 | A | 12/1999 | Molne |
| 6,035,025 | A | 3/2000 | Hanson |
| 6,049,710 | A | 4/2000 | Nilsson |
| 6,058,300 | A | 5/2000 | Hanson |
| 6,064,875 | A | 5/2000 | Morgan |
| 6,070,067 | A | 5/2000 | Nguyen et al. |
| 6,075,982 | A | 6/2000 | Donovan et al. |
| 6,078,583 | A | 6/2000 | Takahara |
| 6,081,508 | A | 6/2000 | West et al. |
| 6,101,378 | A | 8/2000 | Barabash et al. |
| 6,122,503 | A | 9/2000 | Daly |
| 6,122,520 | A | 9/2000 | Want et al. |
| 6,148,197 | A | 11/2000 | Bridges et al. |
| 6,148,198 | A | 11/2000 | Anderson et al. |
| 6,149,353 | A | 11/2000 | Nilsson |
| 6,169,891 | B1 | 1/2001 | Gorham et al. |
| 6,173,181 | B1 | 1/2001 | Losh |
| 6,178,331 | B1 | 1/2001 | Holmes et al. |
| 6,181,935 | B1 | 1/2001 | Gossman et al. |
| 6,185,602 | B1 | 2/2001 | Bayrakeri |
| 6,188,752 | B1 | 2/2001 | Lesley |
| 6,198,431 | B1 | 3/2001 | Gibson |
| 6,199,045 | B1 | 3/2001 | Giniger et al. |
| 6,205,330 | B1 | 3/2001 | Winbladh |
| 6,208,854 | B1 | 3/2001 | Roberts et al. |
| 6,223,046 | B1 | 4/2001 | Hamill-Keays et al. |
| 6,226,529 | B1 | 5/2001 | Bruno et al. |
| 6,249,680 | B1 | 6/2001 | Wax et al. |
| 6,249,744 | B1 | 6/2001 | Morita |
| 6,266,614 | B1 | 7/2001 | Alumbaugh |
| 6,275,848 | B1 * | 8/2001 | Arnold .......................... 709/206 |
| 6,289,373 | B1 | 9/2001 | Dezonno |
| 6,314,108 | B1 | 11/2001 | Ramasubramani et al. |
| 6,317,594 | B1 | 11/2001 | Gossman et al. |
| 6,327,479 | B1 | 12/2001 | Mikkola |
| 6,353,614 | B1 | 3/2002 | Borella et al. |
| 6,393,461 | B1 | 5/2002 | Okada et al. |
| 6,396,913 | B1 | 5/2002 | Perkins, III |
| 6,459,892 | B2 | 10/2002 | Burgan et al. |
| 6,499,053 | B1 | 12/2002 | Marquette et al. |
| 6,564,261 | B1 | 5/2003 | Gudjonsson et al. |
| 7,143,140 | B2 | 11/2006 | Dennis |
| 2003/0023691 | A1 | 1/2003 | Knauerhase |
| 2003/0054767 | A1 | 3/2003 | Mandhyan |
| 2003/0055907 | A1 * | 3/2003 | Stiers ............................ 709/206 |
| 2003/0110129 | A1 * | 6/2003 | Frazier ................... G06Q 20/04 |
| | | | 705/40 |
| 2004/0186894 | A1 * | 9/2004 | Jhingan ................ G06Q 10/107 |
| | | | 709/207 |
| 2004/0186909 | A1 | 9/2004 | Greenwood |
| 2004/0198448 | A1 | 10/2004 | Cannon |
| 2005/0086313 | A1 * | 4/2005 | Lucas et al. .................. 709/206 |
| 2005/0108335 | A1 * | 5/2005 | Naick et al. .................. 709/206 |

(56) References Cited

U.S. PATENT DOCUMENTS

| | | |
|---|---|---|
| 2005/0153686 A1* | 7/2005 | Kall et al. .................. 455/412.1 |
| 2006/0031309 A1* | 2/2006 | Luoffo et al. ................. 709/206 |
| 2006/0046712 A1 | 3/2006 | Shamp |
| 2006/0199536 A1 | 9/2006 | Eisenbach |
| 2006/0282536 A1* | 12/2006 | Popkin et al. ................ 709/226 |
| 2007/0143419 A1* | 6/2007 | Plas ............................. 709/206 |

OTHER PUBLICATIONS

International Search Report in PCT/US2007/11029 dated Jun. 30, 2009.
Bluetooth SIG, Inc., "Fast Facts—Bluetooth Technology 101", 2010, accessed Jan. 4, 2011 at http://www.blutooth.com/English/pages/fast_facts_no_flash.aspx.

* cited by examiner

END USE TRANSPARENT EMAIL ATTACHMENT HANDLING TO OVERCOME SIZE AND ATTACHMENT POLICY BARRIERS

The present application claims priority from U.S. Provisional Application 60/798,332 filed May 8, 2006 to Gadwale entitled "END USER TRANSPARENT EMAIL ATTACHMENT HANDLING TO OVERCOME SIZE AND ATTACHMENT POLICY BARRIERS", the entirety of which is expressly incorporated herein by reference.

BACKGROUND OF THE INVENTION

1. Field of the Invention

This invention relates generally to information technology. More particularly, it relates to electronic mail (Email) and attachment management with respect to Email.

2. Background of the Related Art

Electronic mail ("email") has become common with everyday life. With the advent of the home computer, and proliferation of personal computers (PCs), the ability to send and receive emails at any time is now possible, particularly with the use of a wireless phone device including an appropriate email application.

An email often includes one or more attachments. An email attachment is a file sent along with an email message. If the attached file is encoded, transmitted, and decoded properly, the receiver of the email can open the file and view the document in its original form. In MIME, the standard format of email messages, a file is attached to an email message by encoding both the original message and the file to be attached in a multipart message.

FIG. 4 shows a conventional method of attaching a file to an email, and routing of the email with attachment to a recipient via the Internet.

In particular, as shown in FIG. 4, an email end user 402 drafts an email message to a recipient 408, and attaches a file to the email (e.g., a JPG image file, a WAV movie file, etc.) As is known, the addressed email with attachment is forwarded to an email server 404 associated with, e.g., the user's service provider.

The email server 404 determines the internet address of the intended recipient 408, and routes the email with attachment appropriately to the recipient's email server (which may be the same email server 404, or may be a different email server in an entirely different carrier's and provider's network.

Existing email technology limits the types and sizes of attachments to a given email message. To overcome this conventionally, a user must learn other forms of file sharing, e.g., uploading the attachment manually to an FTP server or web based file sharing systems. To do such an upload, a user must typically zip or otherwise compress or break up their attachments into multiple emails and hope that the recipient mailbox does not become full.

Another conventional technique allows a user to register at a website based upload service, and upload any/all attachments to their account at that website based upload service. For instance, existing websites and services such as X:Drive (http://www.xdrive.com) allow a user to log into the website based upload service, and upload one or more files to the upload service. The upload service provides a link address that accesses the uploaded file(s). Subsequently, the end user logs out of the upload service account, returns to their local email application, and drafts an email addressed to the recipient 408 including a textual link to that file to other users. Most times the user must manually type in the link, leading to possible error in transcription. In any event, this conventional method requires active instruction from the user, and at least two separate functions to be performed by the user.

While effective, such existing email attachment technology includes severe limitations inherent in conventionally sent email attachments. For instance, different rules from different email systems and organizations will likely apply. Moreover, size limits may vary between the sending email server and the recipient's email server. As a result, users often must resort to other techniques and systems to transfer large files.

Another disadvantage is that email attachment transfers are not secure as email is not encrypted by default.

There is a need for a simpler, more efficient method of sending one or more email attachments.

SUMMARY OF THE INVENTION

In accordance with the principles of the present invention, a method and apparatus for automatically removing an email file attachment, comprises detecting a file attachment to an email. The file attachment is removed from the email. The removed file attachment is moved to a download server. A link to the removed file is inserted into the email, and the email is routed to a recipient.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

In accordance with the principles of the present invention, Email server side or client side components either remove email attachments from the relevant email, or identify the attachment while the email is being composed and makes the attachment available from a secure website or file hosting site. The recipient then receives instructions in the email and links to access the attachments rather than the attachments themselves.

The present invention overcomes email attachments size limitations for the sender/recipient mail systems. The invention also overcomes file type limitations related to email attachments, provides improved attachment security, and reduces email bandwidth costs.

Figure 1:
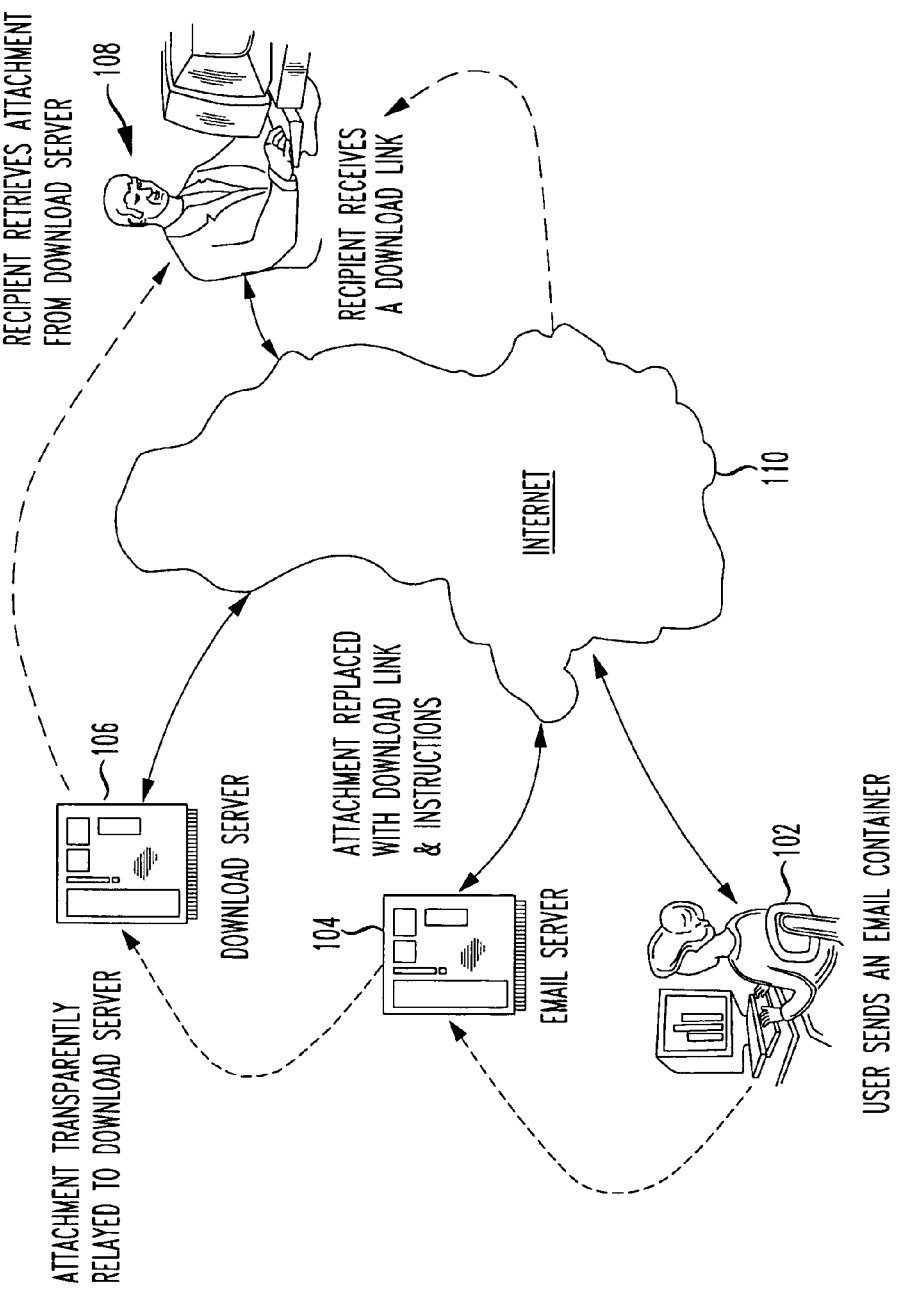
FIG. 1 shows an end email user transparent email attachment handling to overcome size and attachment policy barriers, in accordance with the principles of the present invention.

FIG. 1 shows an end email user transparent email attachment handling to overcome size and attachment policy barriers, in accordance with the principles of the present invention.

In particular, FIG. 1 shows the scanning of all emails at a relevant email server 104 that is sending the email with attachments for the end email user 102. The user 102 sends an email attachment, addressed to a recipient 108 via the Internet 110. The user's email server 104 receives the outgoing email with attachment(s), and automatically removes the attachment(s) from the email and adds an Internet link (or links) to the attachment (or attachments) hosted at an appropriate download server 106. The automatic removal and replacement of attachments with links may be a user configurable parameter, or may be a carrier requirement for all users of the email server 104.

The email server 104 automatically uploads the removed attachment(s) to a hosting website download server 106. Preferably the email server 104 transparently loads the attachment(s) to the download server 106.

The email server 104 eventually routes the email, sans the attachment(s), but with added Internet link address (or addresses), to the intended recipient 108. The recipient 108, upon opening the received email that had the attachment(s) removed, clicks on the added link(s), and accesses Once the recipient 108 receives the email with added link addresses, they retrieve the attachment (or attachments) from the download server 106 via the Internet 110 by clicking on the link in the email.

Figure 2:
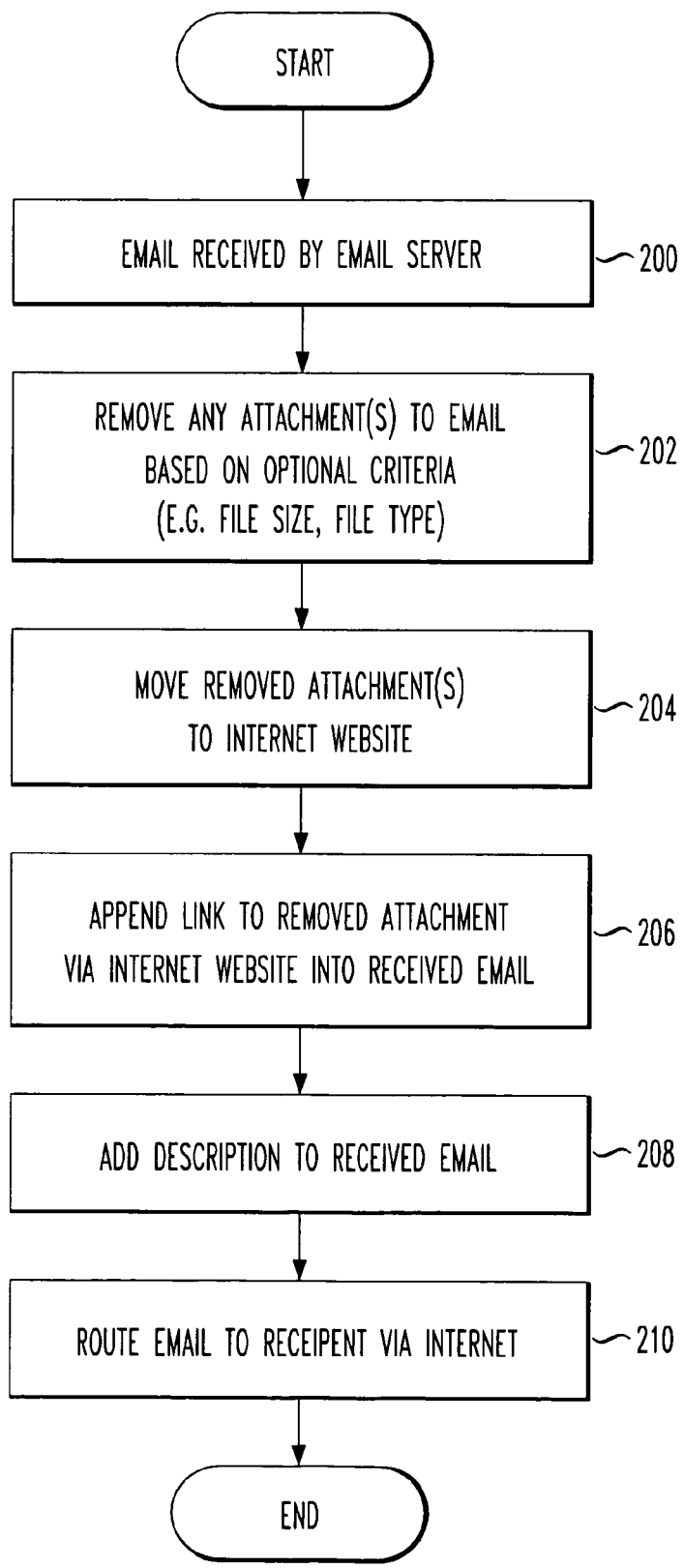
FIG. 2 shows a method of automatic removal and hosting of email attachment(s) at an Internet website, with automatic insertion of a link thereto into the underlying email, in accordance with an embodiment of the invention.

FIG. 2 shows a method of automatic removal and hosting of email attachment(s) at an Internet website, with automatic insertion of a link thereto into the underlying email, in accordance with an embodiment of the invention.

In particular, as shown in step 200 of FIG. 2, an email is received by the email server 104.

In step 202, the email server removes any/all attachments to the received email. The removal may be for all received emails, or it may optionally be based on optional criteria, such as file size, file type, etc. For instance, only files larger than 10 Mb may be automatically removed and hosted at the download server 106 for retrieval by the recipient 108. Similarly, with a file type option, perhaps only image files such as JPG or MOV files will be removed as attachments, automatically moved to the download server 106, and provided to the recipient upon selection of the download link added to their received email.

In step 204, removed attachment(s) are moved to the Internet website associated with the download server 106.

In step 206, the email server 104 appends or adds an addressable hyperlink to the email, for use by the recipient 108. This link may be password protected if desired by the particular application.

In step 208, a description of how to access the file at the website associated with the download server 106, etc., may be added to the email by the email server 104.

In step 210, the email is routed by the email server 104 to the recipient 108 via the Internet to the recipient's email server, for access by the recipient's email application.

Thus, all attachments are removed before sending based on optional criteria. Exemplary optional criteria include file size, file type, etc.

The attachments are moved to a world accessible website from which the attachment may be downloaded by clicking on a link using either HTTP, HTTPS, FTP, or any other secure or unencrypted file transfer protocol where the file transfer can be initiated by a remote client by simply clicking on a hyperlink.

A link is appended to the email, and a description added to the email that has been stripped of the attachment. The link leads to the relevant attachment storage area.

Figure 3:
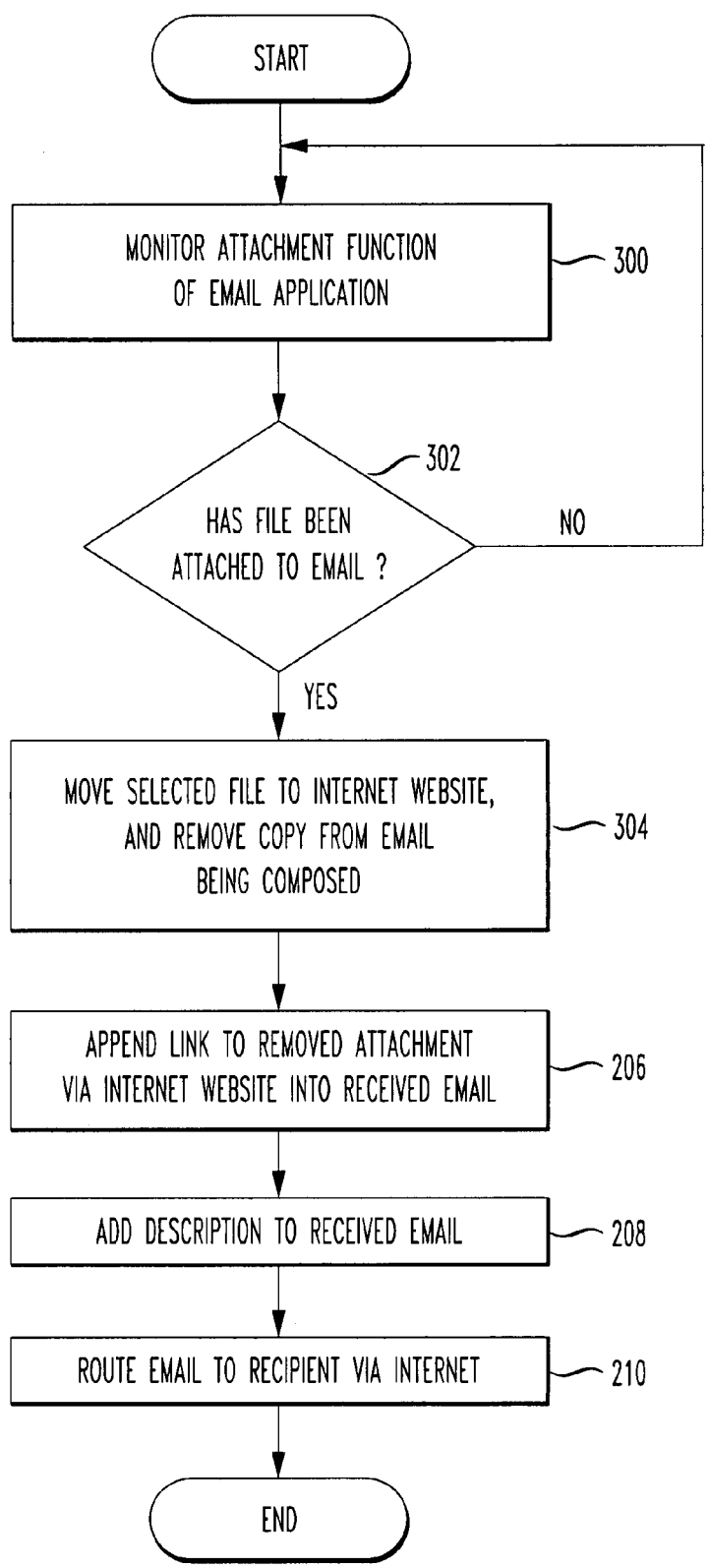
FIG. 3 shows another method of automatic hosting of email attachment(s) at an Internet website upon attachment by the sender, with automatic insertion of a link thereto into the underlying email, in accordance with another embodiment of the present invention.
Figure 4:
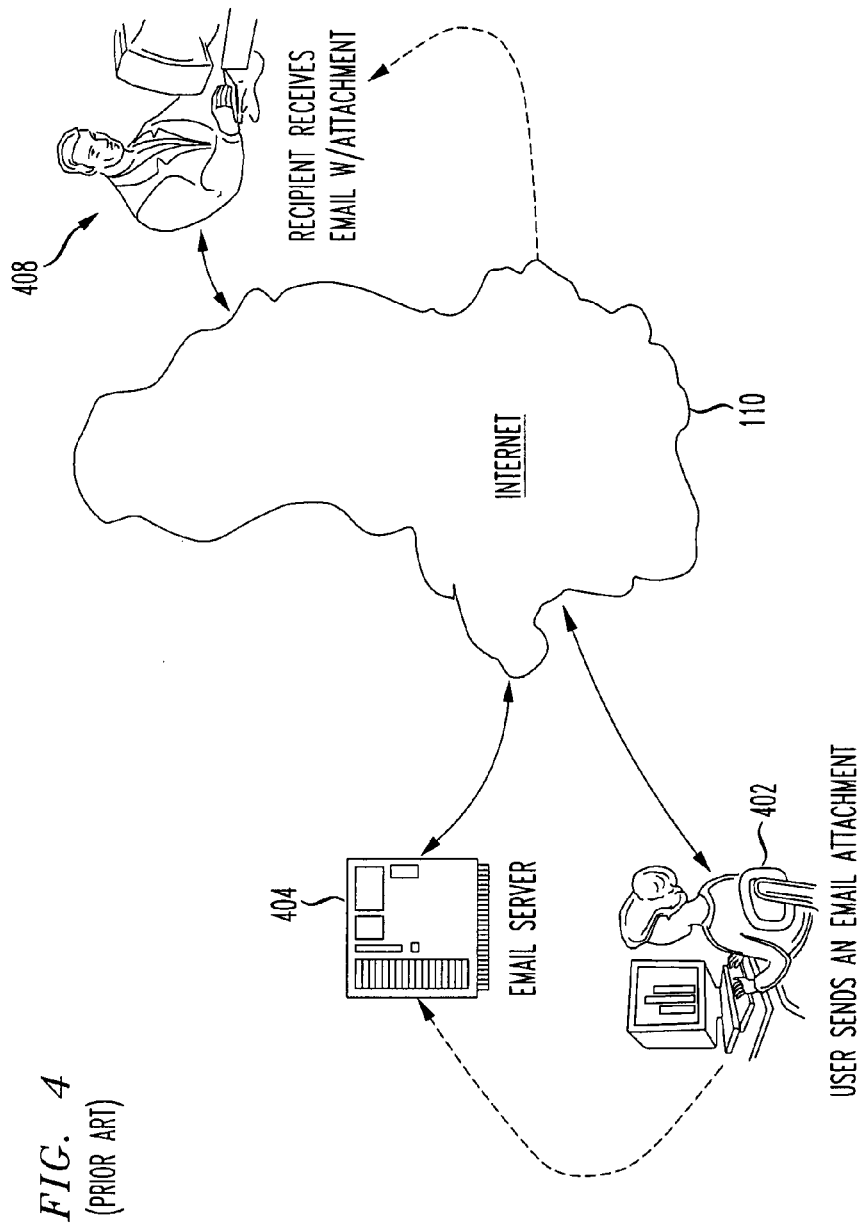
FIG. 4 shows a conventional method of attaching a file to an email, and routing of the email with attachment to a recipient via the Internet.

FIG. 3 shows another method of automatic hosting of email attachment(s) at an Internet website upon attachment by the sender, with automatic insertion of a link thereto into the underlying email, in accordance with another embodiment of the present invention.

In particular, as shown in step 300 of FIG. 3, the email server 104 or other appropriate network application may monitor the end user's attachment function to emails, so that when the user browses to attach a file to an email, the selected attachment is not actually attached to the email but rather is uploaded to the download server 106 preferably automatically and invisibly to the user 102.

In step 302, the email server 104 or other appropriate network application determines if a file has been selected for attachment to an email. Preferably step 302 becomes active when the user opens a COMPOSE or similar email drafting page, alerting the email server 104 or other appropriate network application of the increased likelihood of attachment of a file by the user 102.

In step 304, the selected file for attachment is moved to the download server 106 for access by the recipient 108 via the corresponding Internet website, and (if necessary), remove the attached copy from the email being composed by the user 102.

Steps 206, 208, and 210 in FIG. 3 are otherwise as shown and described with respect to the embodiment of FIG. 2.

Accordingly, emails are all scanned as they are being composed, before they are submitted to the relevant server. Alternatively, a user's email application (e.g., Microsoft™ Outlook™) may alert an email server upon attachment of a file to an email being composed.

During composition, as soon as an email attachment is selected, it is made available on a suitable website. Also, download link information is appended to the email being composed.

The present invention results in reduced email bandwidth costs since only users who want to retrieve the attachment will click on the link and cause the attachment to be transmitted.

The invention also results in improved security. For instance, detection of a virus in the attachment requires that only the single copy on the website need be removed, as recipient mailboxes will not contain the attachment.

Moreover, sensitive attachments can include an expiration time, and thus "expire" and no longer be available for download after a certain period of time.

Other benefits are that erroneous attachments can be removed more easily without worrying about erroneous documents in end user mailboxes. Entire directories and large volumes of data can be shared-something previously not possible through email.

In a preferred implementation, the hyperlink is coded so that it can only be accessed when clicked on by a recipient whose IP address matches the domain name to which the email was sent.

In another implementation, the hyperlink in the emails is setup so that the attachment can be downloaded only once, or only a predetermined minimal number of times, after which the link automatically expires without further user instruction.

The invention has particular applicability with all existing email users. It also has applicability with software products that include a feature to remove attachments from outgoing messages and allow recipients to download them separately.

While the invention has been described with reference to the exemplary embodiments thereof, those skilled in the art will be able to make various modifications to the described embodiments of the invention without departing from the true spirit and scope of the invention.

What is claimed is:

1. A method of automatically removing an email file attachment, comprising:
   prior to transmission of an email from a physical user device to a physical email server, detecting, with said physical user device, of a file attachment to said email;
   prior to transmission of said email from said physical user device to said physical email server and in response to said detection of said file attachment to said email, inserting a link to said file attachment in said email, said link being coded to an Internet Protocol (IP) address of an addressed recipient of said email, wherein said link is accessible only by a device with said IP address; and
   moving said file attachment from said physical user device to a physical download server for retrieval of said file attachment via said link, wherein said moving comprises removing said file attachment from said email.

2. The method of automatically removing an email file attachment according to claim 1, wherein:
   said physical download server is accessible by a physical recipient device via an Internet.

3. The method of automatically removing an email file attachment according to claim 1, wherein:
   said inserting said link occurs based on at least one file-related parameter.

4. The method of automatically removing an email file attachment according to claim 3, wherein:
   said file-related parameter is a file size greater than a predetermined threshold size.

5. The method of automatically removing an email file attachment according to claim 3, wherein:
   said file-related parameter is a file type matching a predetermined file type.

6. The method of automatically removing an email file attachment according to claim 1, wherein:
   said moving said file attachment is performed before said inserting said link.

7. The method of automatically removing an email file attachment according to claim 1, wherein:
   said removed file attachment is moved to said physical download server via the Internet.

8. The method of automatically removing an email file attachment according to claim 1, further comprising:
   routing said email to a physical recipient device.

* * * * *